United States Patent
Muttik et al.

(10) Patent No.: US 9,614,866 B2
(45) Date of Patent: *Apr. 4, 2017

(54) SYSTEM, METHOD AND COMPUTER PROGRAM PRODUCT FOR SENDING INFORMATION EXTRACTED FROM A POTENTIALLY UNWANTED DATA SAMPLE TO GENERATE A SIGNATURE

(71) Applicant: McAfee, Inc., Santa Clara, CA (US)

(72) Inventors: Igor Muttik, Berkhamsted (GB); Joel R. Spurlock, Newberg, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,855

(22) Filed: Aug. 11, 2015

(65) Prior Publication Data

US 2016/0036832 A1 Feb. 4, 2016

Related U.S. Application Data

(63) Continuation of application No. 14/063,813, filed on Oct. 25, 2013, now Pat. No. 9,106,688, which is a continuation of application No. 11/946,777, filed on Nov. 28, 2007, now Pat. No. 8,590,039.

(51) Int. Cl.
*H04L 29/00* (2006.01)
*H04L 29/06* (2006.01)
*G06F 21/56* (2013.01)

(52) U.S. Cl.
CPC ............ *H04L 63/145* (2013.01); *G06F 21/56* (2013.01); *G06F 21/563* (2013.01); *G06F 21/564* (2013.01); *H04L 63/14* (2013.01); *H04L 63/1416* (2013.01); *H04L 63/1441* (2013.01); *G06F 21/561* (2013.01); *G06F 21/566* (2013.01)

(58) Field of Classification Search
CPC .................................. G06F 21/05; H04L 63/14
USPC ............................... 726/22–25; 713/187–188
See application file for complete search history.

(56) References Cited

U.S. PATENT DOCUMENTS

| | | | | |
|---|---|---|---|---|
| 7,694,150 B1 * | 4/2010 | Kirby | ...................... | G06F 21/55 713/188 |
| 7,802,303 B1 * | 9/2010 | Zhao | ...................... | G06F 21/564 370/230 |
| 2004/0255163 A1 * | 12/2004 | Swimmer | ............. | G06F 21/552 726/24 |
| 2008/0127336 A1 * | 5/2008 | Sun | ........................ | G06F 21/566 726/22 |

OTHER PUBLICATIONS

Xu, J-Y., et al. "Polymorphic malicious executable scanner by API sequence analysis." Hybrid Intelligent Systems, 2004. HIS'04. Fourth International Conference on. IEEE, 2004.*

* cited by examiner

*Primary Examiner* — Madhuri Herzog
(74) *Attorney, Agent, or Firm* — Blank Rome, LLP

(57) ABSTRACT

A system, method and computer program product are provided for sending information extracted from a potentially unwanted data sample to generate a signature. In use, information is extracted from a portion of a sample of potentially unwanted data. Further, the information is sent to generate a signature.

23 Claims, 7 Drawing Sheets

SYSTEM, METHOD AND COMPUTER PROGRAM PRODUCT FOR SENDING INFORMATION EXTRACTED FROM A POTENTIALLY UNWANTED DATA SAMPLE TO GENERATE A SIGNATURE

FIELD OF THE INVENTION

The present invention relates to identifying unwanted data, and more particularly to signatures utilized for identifying unwanted data.

BACKGROUND

Traditionally, security systems have been utilized for identifying unwanted data (e.g. malware, etc.). Oftentimes, the security systems utilize signatures of known unwanted data for identifying instances of unwanted data (e.g. unwanted data structures, unwanted programs, etc.), such as, for example, by matching the signature to an instance of unwanted data. However, conventional techniques for generating signatures utilized by such security systems have exhibited various limitations.

For example, signatures of known unwanted data have customarily been generated based on a full sample of data that has been detected and determined to be at least potentially unwanted. Unfortunately, receiving full samples of potentially unwanted data at a system for generating such signatures has resulted in excessive bandwidth and resource consumption, particularly when the number and/or size of samples being received is large. There is thus a need for addressing these and/or other issues associated with the prior art.

SUMMARY

A system, method and computer program product are provided for sending information extracted from a potentially unwanted data sample to generate a signature. In use, information is extracted from a portion of a sample of potentially unwanted data. Further, the information is sent to generate a signature.

DETAILED DESCRIPTION

Figure 1:
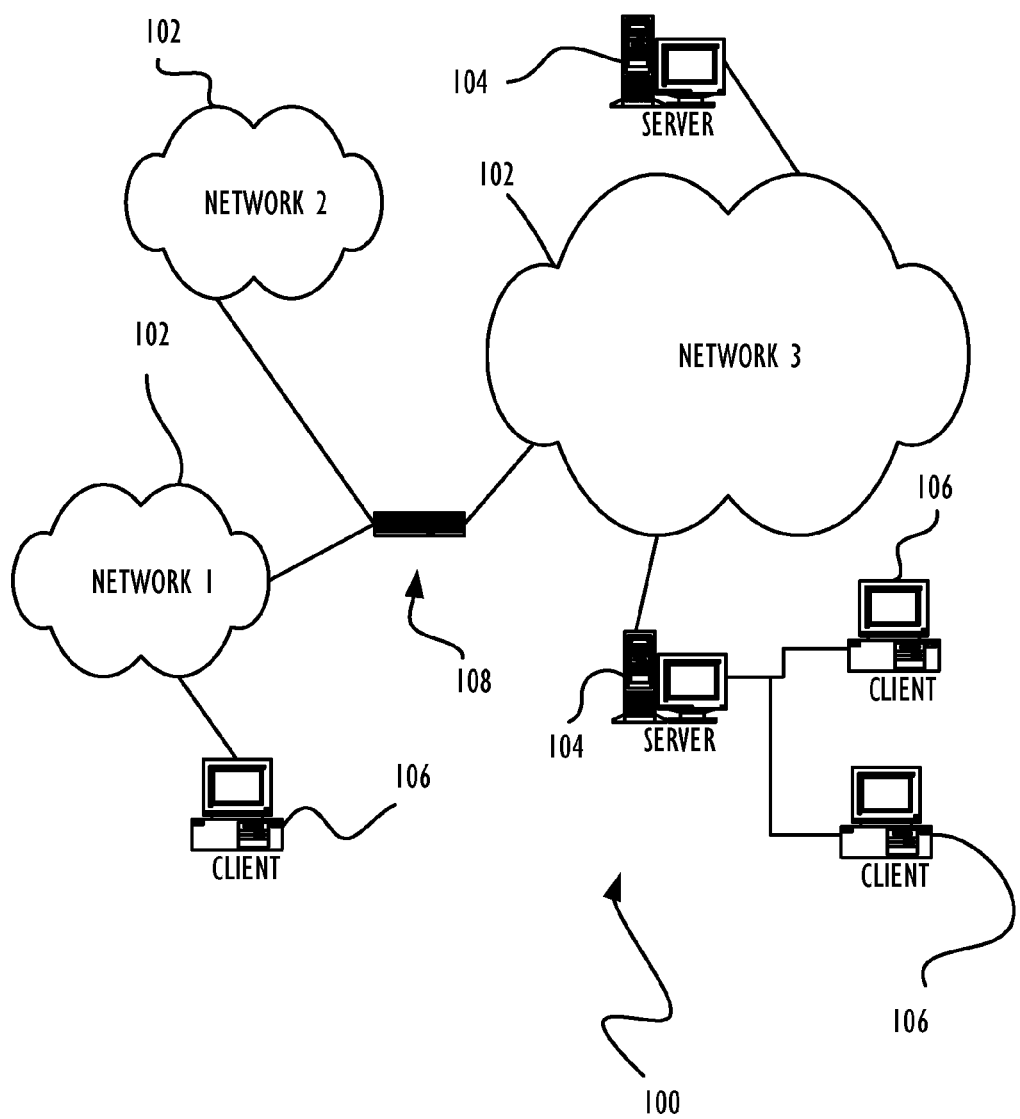
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, a peer-to-peer network, a personal area network (PAN), etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
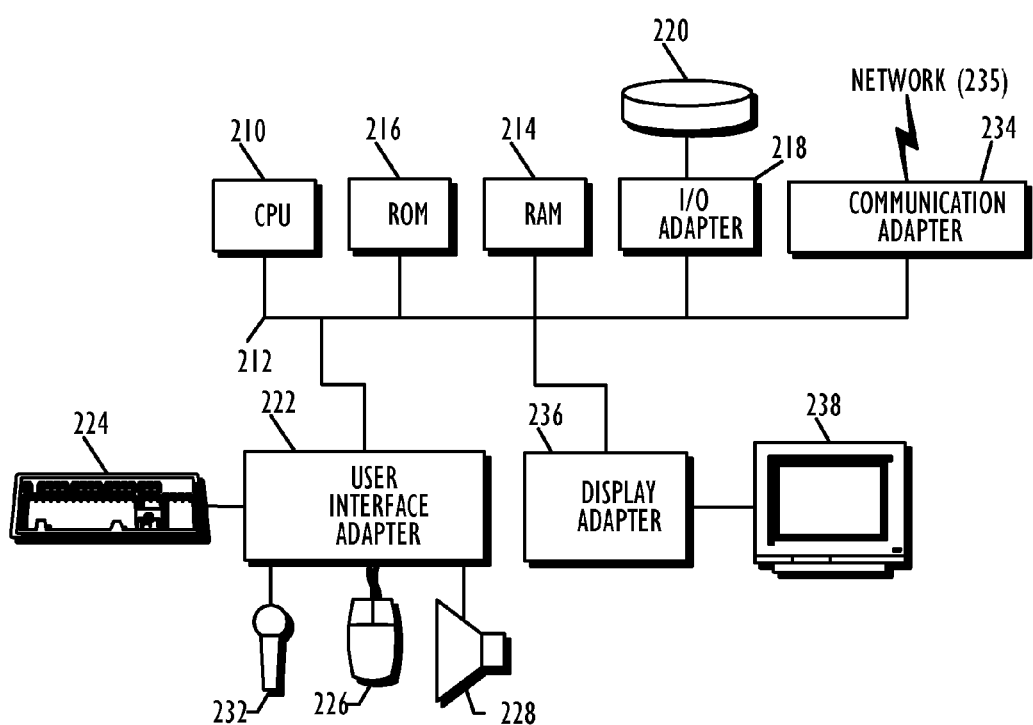
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
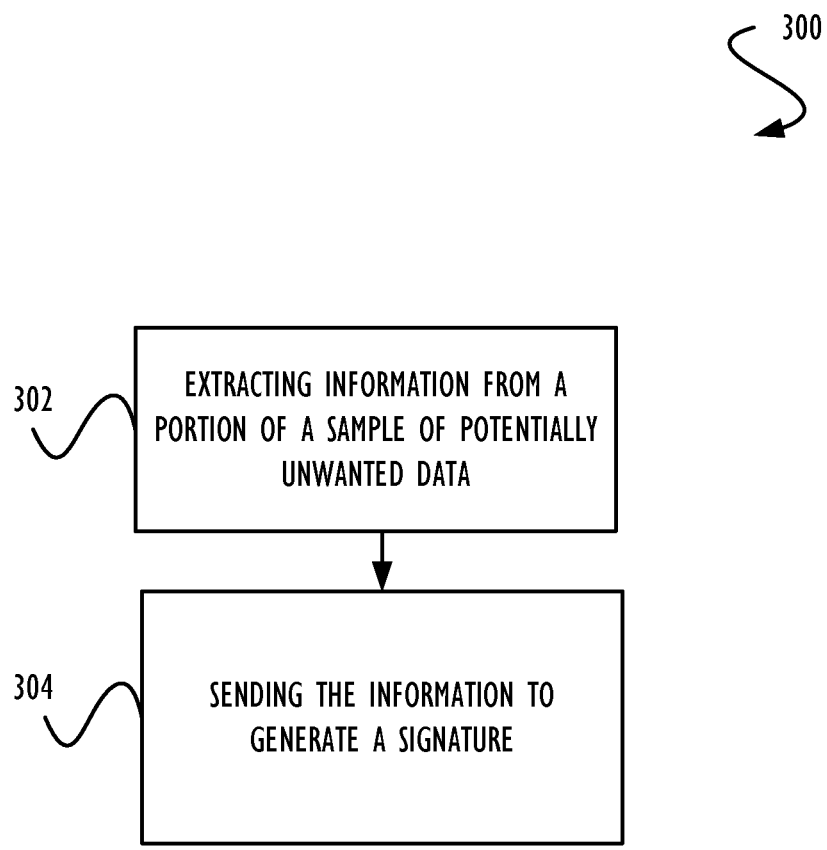
FIG. 3 shows a method for sending information extracted from a potentially unwanted data sample to generate a signature, in accordance with one embodiment.

FIG. 3 shows a method 300 for sending information extracted from a potentially unwanted data sample to generate a signature, in accordance with one embodiment. As an option, the method 300 may be carried out in the context of the architecture and environment of FIGS. 1 and/or 2. Of course, however, the method 300 may be carried out in any desired environment.

As shown in operation 302, information is extracted from a portion of a sample of potentially unwanted data. In the context of the present description, the potentially unwanted data may include any data that is determined to be at least potentially unwanted. For example, the unwanted data may include malware (e.g. a virus, a Trojan, a worm, etc.), spyware, unsolicited electronic messages, etc.

Further, the unwanted data may be included in a data structure, program code, etc. For example, the malware may be represented by a file on a storage media. As an option, the potentially unwanted data may include a plurality of portions. Such portions may not necessarily be contiguous (e.g. within a file, etc.).

In one embodiment, the data may be determined to be at least potentially unwanted utilizing a computer security system. Just by way of example, the computer security system may include a behavioral analysis system that detects the potentially unwanted data. As an option, the behavioral analysis system may determine that the data is at least potentially unwanted based on heuristics (e.g. heuristic rules), suspicious behaviors, etc.

Additionally, the sample of the portion of the unwanted data may include any entity capable of representing the potentially unwanted data. Thus, in one embodiment, the sample may include code of the potentially unwanted data. In another embodiment, the sample may include a memory image of the potentially unwanted data. In yet another embodiment, the sample may include a network packet (e.g. a network packet that includes the potentially unwanted data, etc.). In still yet another embodiment, the sample may include a file (e.g. text file, etc.), script, application, etc. in which the potentially unwanted data is located.

To this end, the portion of the sample of the potentially unwanted data may include any subpart, component, section, segment, etc. of the sample. Just by way of example, the portion may include a macro within a file in which the unwanted data was detected, a body of a message in which the unwanted data was detected, etc. Moreover, the portion may be determined in any desired manner.

In one embodiment, the portion may be determined based on a predetermined offset. The offset may indicate the starting point of the portion within the sample of the potentially unwanted data. Optionally, a rule may indicate the predetermined offset. Such rule may be received from a central server, as another option.

Further, a plurality of rules may each indicate a different offset to be utilized in identifying portions of various samples of potentially unwanted data. Each rule may be particular to a type of the potentially unwanted data, a type of the sample of the potentially unwanted data, a location of the potentially unwanted data, etc. Accordingly, in another embodiment, the portion of the sample may be determined based on a type of an object [e.g. text file, script, application, macro, uniform resource locator (URL), etc.] in which the potentially unwanted data is located.

In yet another optional embodiment, the portion may be determined based on a type of an operating environment (e.g. WINDOWS®, Visual Basic® script, etc.) associated with the potentially unwanted data. In still yet another embodiment, the portion may be determined based on a location of the potentially unwanted data. Of course, it should be noted that the portion of the sample may be determined based on any characteristic associated with such potentially unwanted data, or sample thereof.

Still yet, the information extracted from the portion of the sample of the potentially unwanted data may include any information associated with, included in, etc. such portion. In one embodiment, the information may include a string included in the portion of the sample. In another embodiment, the information may include a hash of the portion of the sample. In yet another embodiment, the information may include a hash of several non-contiguous portions of the potentially unwanted data computed as if such portions were one contiguous block of data. Just by way of example, the portion of the sample may be processed (e.g. whitespaces, carriage returns, variable names, etc. removed, etc.) and subsequently hashed for extracting the information.

In yet another embodiment, the information may include at least one numeric, symbolic, string, etc. identifier associated with the portion of the sample. Such identifier may include a unique identifier, as an option. For example, the unique identifier may indicate a rule utilized to extract the information. As another example, the identifier may include a location identifier for indicating a position or environment (e.g. system file, cached file, temporary folder, etc.) from which the information was extracted, a type of the information extracted, etc. Optionally, information to be extracted may be indicated by a rule, such as, for example, the rule described above that may be utilized for determining the portion of the sample.

Moreover, the information may be extracted in any desired manner. As noted above, the information may be extracted by computing a hash of the portion of the sample of the potentially unwanted data. As another option, the information may be extracted by copying a string from the portion of the sample of the potentially unwanted data. Further, the information may be extracted based on a rule. For example, the rule may indicate the technique by which the information is to be extracted, such as hashing the portion of the sample to extract the information, copying a string from the portion of the sample, etc.

Furthermore, the information is sent to generate a signature (e.g. detection record), as shown in operation 304. In the context of the present description, the signature may include any object generated for detecting instances of the potentially unwanted data. For example, the signature may include a fingerprint of the potentially unwanted data. Thus, the signature may at least potentially be capable of being utilized (e.g. by a security system, such as a scanning security system) to detect instances of the potentially unwanted data. Optionally, such detection may include identifying data that matches the signature as at least potentially unwanted data.

Additionally, the signature may be generated in any desired manner that utilizes the information. In one embodiment, the information may be processed based on the rule that was utilized to extract the information from the portion of the sample of the potentially unwanted data. Thus, such rule may be accessible by (e.g. located on, etc.) and/or otherwise interpretable by a system to which the information is sent. For example, the rule may indicate the manner in which the information is interpreted (e.g. whether to interpret the information as a hash, a string, etc.). In another embodiment, the information may be included in the signature, such that the information may be compared to data for determining whether the data includes potentially unwanted data.

In one embodiment, the information may be sent from a device, such as a client device, via which such information was extracted. Just by way of example, the information may be sent from any of the devices described above with respect to FIGS. 1 and/or 2. In another embodiment, the information may be sent to any other device, such as a server device, capable of generating a signature utilizing the information.

It should be noted that the information may be sent in any manner. For example, the information may be sent over a network, such as over a secure channel of the network. As another example, the information may be sent via an electronic mail (email) message (e.g. as an attachment to the email message, etc.).

In this way, information extracted from only a portion of a sample of potentially unwanted data may be sent to generate a signature. Extracting the information from such portion may optionally prevent the entire sample of potentially unwanted data from being sent to generate the signature. Accordingly, bandwidth and/or resource consumption may be limited, particularly where the size of the sample is large. Just by way of example, a rule utilized to extract the information may be selected based on available bandwidth and a speed of a network connection in order to minimize the size of the information sent. Optionally, several extraction rules may be applicable to a particular sample of potentially unwanted data, where the one of such rules that is selected is the one that produces the smallest output when the network connection has limited capacity (e.g. below a predefined capacity, etc.).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
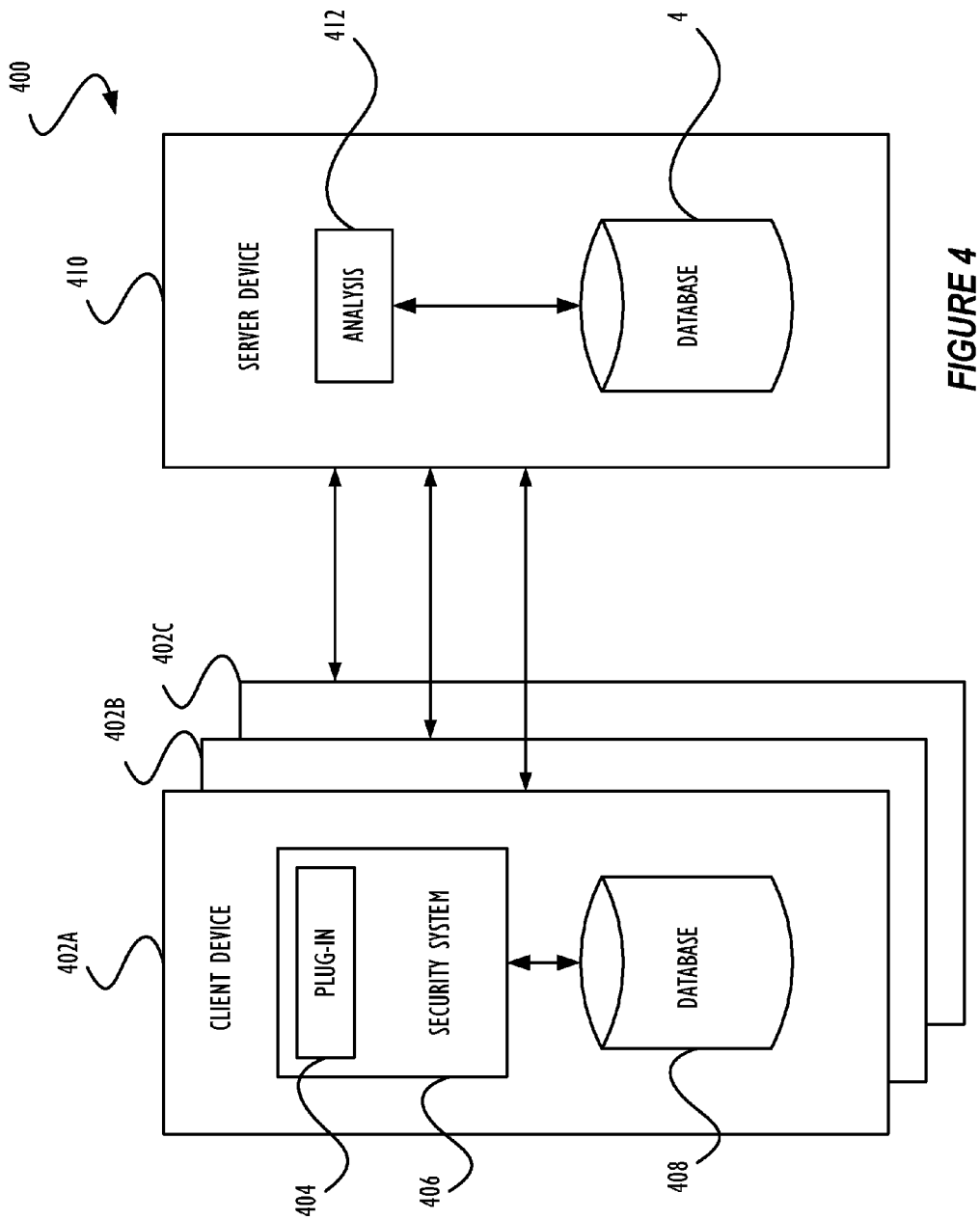
FIG. 4 shows a system for sending information extracted from a potentially unwanted data sample to generate a signature, in accordance with another embodiment.

FIG. 4 shows a system 400 for sending information extracted from a potentially unwanted data sample to generate a signature, in accordance with another embodiment. As an option, the system 400 may be implemented to carry out the method 300 of FIG. 3. Of course, however, the system 400 may be implemented in any desired environment. It should also be noted that the aforementioned definitions may apply during the present description.

As shown, each of a plurality of client devices 402A-C is in communication with a server device 410. As an option, the client devices 402A-C may communicate with the server device 410 via a network (not shown). Of course, however, the client devices 402A-C may communicate with the server device 410 in any desired manner.

In the context of the present embodiment, each client device 402A-C may include a user computer, but of course may also include any of the devices described above with respect to FIGS. 1 and/or 2. Similarly, the server device 410 may also include any of the devices described above with respect to FIGS. 1 and/or 2.

Additionally, each client device 402A-C includes a security system 406. Such security system 406 may include a behavioral analysis system for detecting at least potentially unwanted data located on an associated client device 402A-C. For example, the security system 406 may detect potentially unwanted data utilizing heuristics. Optionally, heuristic rules may be stored in a database 408 of the client device 402A-C. Such client database 408 may be updated by the server device 410, in one embodiment. Of course, it should be noted that each client device 402A-C may also include various other security systems, such as an anti-virus system, a firewall, an anti-spyware system, etc.

Furthermore, the security system 402 includes a plug-in 404. The plug-in 404 may include any application that interacts with the security system 406. Optionally, the plug-in 404 may be capable of being updated (e.g. by the server device 410, etc.).

As an option, the plug-in 404 may extract information from a portion of a sample of potentially unwanted data detected utilizing the security system 406. For example, in response to detection of potentially unwanted data by the security system 406, the plug-in 404 may identify a sample (e.g. memory image, packet, etc.) of the detected potentially unwanted data. The plug-in 404 may further identify a portion of such sample from which to extract the information.

In one embodiment, the plug-in 404 may identify the portion based on a rule or a set of rules. The rule(s) may be stored in the database 408 located on the client device 402A-C. Thus, as shown, the security system 406 may be in communication with the client database 408, such that the plug-in 404 of the security system 406 may identify the rule in the client database 408. Optionally, the plug-in 404 may search the client database 408 for a rule associated with the sample of potentially unwanted data. Just by way of example, the plug-in 404 may search the client database 408 utilizing a characteristic of the potentially unwanted data, or the sample thereof.

Moreover, the plug-in 404 may also extract the information based on the rule(s). For example, the rule(s) may indicate the type of extraction to perform on the portion of the sample of the potentially unwanted data. In one embodiment, the rule may indicate that the portion of the sample is to be processed (e.g. by a filter, etc.) for extracting the information.

Thus, the portion of the sample of the potentially unwanted data may be hashed for extracting the information. In this way, the information may include a hash, but in other embodiments may also include a checksum, algorithmic digest, etc. In another embodiment, the plug-in 404 may extract the information by copying a string from the portion of the sample. Of course, it should be noted that the plug-in 404 may extract the information in any desired manner.

Moreover, the plug-in 404 may tag the information with a unique identifier and/or location identifier. The unique identifier may indicate the type of extraction used to extract the information. For example, the unique identifier may indicate the rule based on which the information was extracted. In addition, the location identifier may identify the location in the sample of the potentially unwanted data from which the information was extracted.

The client device 402 may then send the information, including the tagged unique identifier and/or location identifier, to the server device 410. As another option, such unique identifier and/or location identifier may be indicated based on routing information associated with the transmission of the information from the client 402. For example, a port, address, etc. of the client device 402 and/or a protocol utilized to send the information to the server device 410 may indicate to the server device 410 the unique identifier and/or location identifier associated with such information.

Thus, the client device 402 may be prevented from sending the entire sample of the potentially unwanted data to the service device 410. As an option, the information may be sent over a network. In one embodiment, the client device 402 may send the information in an email attachment or via a peer-to-peer communication. To this end, the server device 410 may received only the information extracted from the portion of the sample of the potentially unwanted data. As an option, if the server device 410 has knowledge about possible output of the plug-in 404 (e.g. by way of understanding the unique identifier and/or location identifier supplied along with the extracted information), the server device 410 may be capable of receiving the output of the plug-in 404.

As shown, the server device 410 includes an analysis module 412. To this end, in response to receipt of the information by the server device 410, the analysis module 412 may generate a signature utilizing the information. Optionally, the analysis module 412 may store the information in a queue prior to generating the signature.

For example, the analysis module 412 may communicate with a database 414 of the server device 410 which stores the rules in the client database 408. Thus, the analysis module 412 may utilize the rule used by the client device 402 to extract the information, and optionally the location identifier included in the received information, to interpret the information for use in generating the signature. Optionally, the analysis module 412 may identify such rule in the server database 414 based on the unique identifier included in the received information.

Once the signature of the potentially unwanted data is generated by the server device 410, the server device 410 may store the signature in the server database 414. Of course, however, the server device 410 may also store the signature in a database separate from the server database 414 (not shown). Still yet, the server device 410 may distribute the generated signature to each of the client devices 402A-C. Once the client devices 402A-C receive the signature, such client devices 402A-C may then store the signature in an associated client database 408. In this way, the client devices 402A-C, including for example a scanning security system of the client devices 402A-C, may utilize the signature for detecting the potentially unwanted data.

Figure 5:
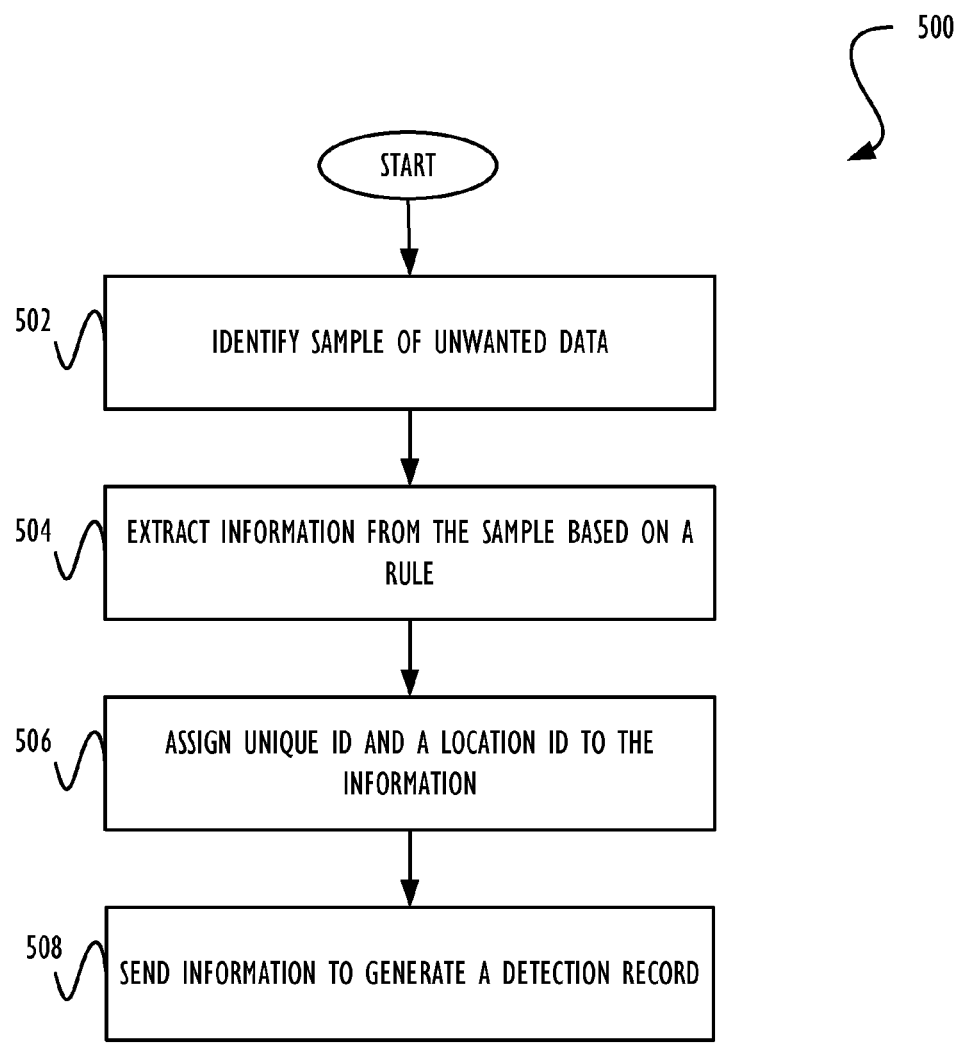
FIG. 5 shows a method for sending information to generate a detection record, in accordance with yet another embodiment.

FIG. 5 shows a method 500 for sending information to generate a detection record, in accordance with yet another embodiment. As an option, the method 500 may be carried out in the context of the functionality and architecture of FIGS. 1-4. For example, the method 500 may be carried out utilizing each of the client devices 402A-C of FIG. 4. Of course, however, the method 500 may be carried out in any desired environment. Again, it should also be noted that the aforementioned definitions may apply during the present description.

As shown in operation 502, a sample of unwanted data is identified. In one embodiment, a behavioral analysis security system may detect the unwanted data using heuristics. For example, the heuristics may be applied to activity performed on a client device for identifying unwanted data on such client device. Further, the sample may be identified by identifying the location of the unwanted data. Thus, a file storing the unwanted data, an application executing the unwanted data, etc. may be identified as the sample.

Additionally, information from the sample is extracted based on a rule, as shown in operation 504. Optionally, a characteristic of the unwanted data, such a location of the unwanted data, a type of the unwanted data, etc. may be utilized for determining the rule. Just by way of example, the characteristic may be utilized to query a database of rules indicating different techniques for extracting information from samples of unwanted data.

Thus, the information may be extracted from the sample based on an extraction technique indicated by the rule. Just by way of example, the rule may indicate that the information to be extracted from the sample is a hash of a portion of the sample. Thus, extracting the information may include hashing the portion of the sample. As another example, the rule may indicate that a string included at a particular offset within the sample is to be copied, such that extracting the information may include copying the string at the predetermined offset.

Moreover, a unique identifier and a location identifier are assigned to the information. Note operation 506. The unique identifier may indicate the rule based on which the information was extracted from the sample. Thus, the unique identifier may indicate the technique utilized for extracting the information from the sample. Just by way of example, a unique identifier of "1" may designate that the information is a hash of at least a portion of the sample.

In addition, the location identifier may indicate the location in the sample from which the information was extracted. For example, the location identifier may identify the offset within the sample from which the information was extracted. As another option, the location identifier may indicate the type of information extracted from the sample, such as, for example, whether the information includes a hash, string, etc.

Table 1 illustrates exemplary unique identifiers (UID) and location identifiers (LID) capable of being assigned to extracted information. It should be noted that such unique identifiers and location identifiers are set forth for illustrative purposes only, and thus should not be construed as limiting in any manner.

TABLE 1

| IDENTIFIER | DEFINITION |
| --- | --- |
| UID_01 | Checksum-based extraction |
| UID_02 | Signature-based extraction for a packet |
| LID_01 | a hash [e.g. message digest algorithm 5 (MD5) hash] of a sample of a script in which whitespace has been removed |
| LID_02 | a checksum [e.g. secure hash algorithm 1 (SHA1) checksum] of the first 10 kilobytes of the sample if the sample is of a portable executable (PE) type |
| LID_03 | 64 bytes extracted at offset 0x200 in second section of a Win32 dynamically linked library (DLL) |

Furthermore, as shown in operation 508, the information is sent to generate a detection record. With respect to the present embodiment, the information may include the extracted information and the assigned unique identifier and/or location identifier. Also with respect to the present embodiment, the detection object may include a signature. Still yet, the information may be sent to a server device capable of utilizing the information to generate the detection object.

Figure 6:
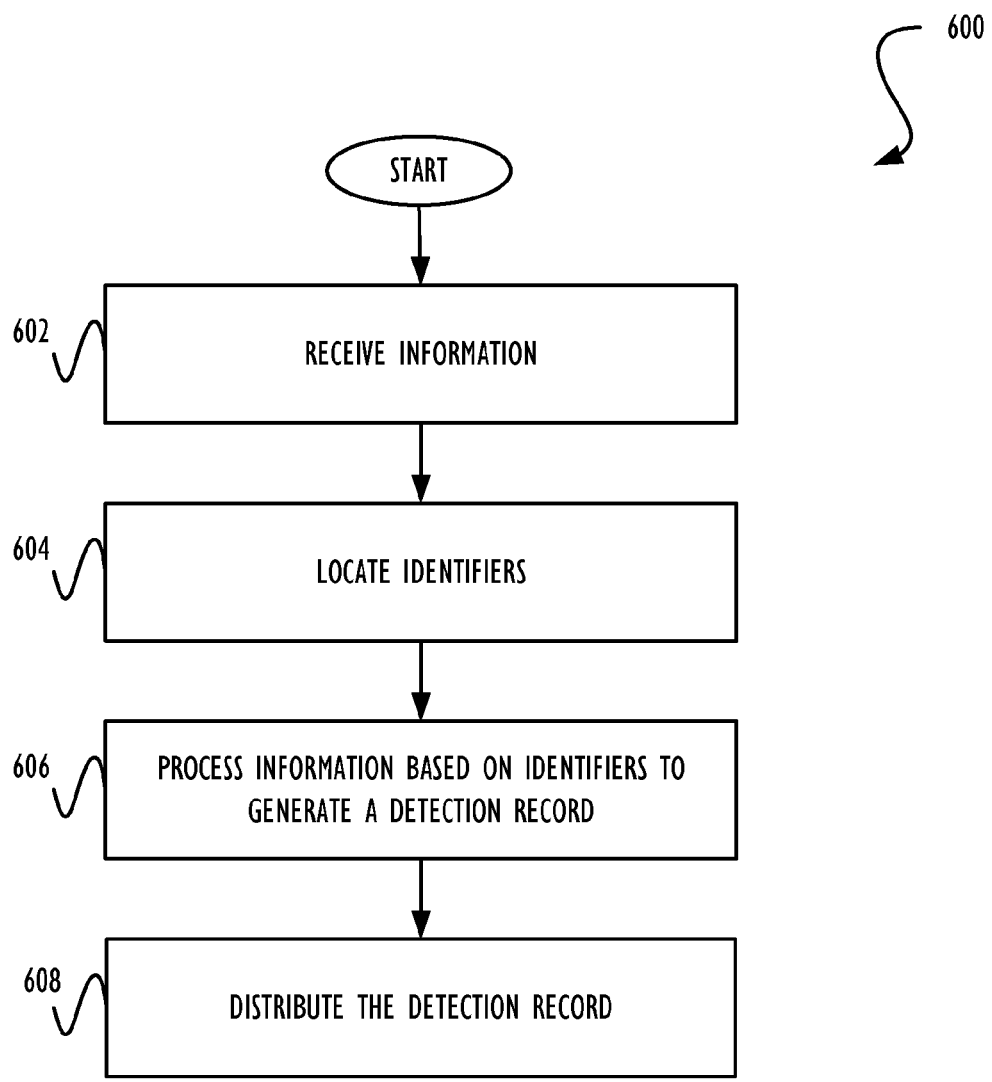
FIG. 6 shows a method for receiving information to generate a detection record, in accordance with still yet another embodiment.

FIG. 6 shows a method 600 for receiving information to generate a detection object, in accordance with still yet another embodiment. As an option, the method 600 may be carried out in the context of the functionality and architecture of FIGS. 1-5. For example, the method 600 may be carried out utilizing the server device 410 of FIG. 4. Of course, however, the method 600 may be carried out in any desired environment. Again, it should also be noted that the aforementioned definitions may apply during the present description.

As shown in operation 602, information is received. In the context of the present embodiment, the information may include information extracted from a portion of a sample of unwanted data, along with a unique identifier and/or location identifier assigned to such extracted information. For example, the information may be received by a client device which extracted the information from the sample.

Additionally, identifiers are located. Note operation 604. With respect to the present embodiment, the identifiers may include the unique identifier and the location identifier assigned to the information. Optionally, the identifiers may be located within the information, as tags to the information, etc. As another option, the identifiers may be located based on a protocol utilized to receive the information, a port and/or address from which the information was received, etc.

Furthermore, as shown in operation 606, the information is processed based on the identifiers to generate a detection record. In various embodiments, the identifiers may indicate the format of the information (e.g. hash, string, etc.), a technique utilized to extract the information from the sample of the unwanted data, etc. Thus, the identifiers may be utilized for generating a detection record that is based on the same format, techniques, etc. as that used to extract the information.

Just by way of example, if the information includes a hash of a portion of the sample of unwanted data at a particular offset within such sample, the detection record may include such hash. In addition, the detection record may indicate that the hash is to be compared to data at the same particular offset utilized to extract the information. Thus, the detection record may be utilized by a security system for identifying other instances of the unwanted data that match the detection record.

Still yet, the detection record is distributed, as shown in operation 608. In one embodiment, the detection record may be sent to client devices (e.g. over a network, etc.). In this way, the client devices may utilize the detection record for identifying other instances of the unwanted data, as describe above. It should be noted that the detection record may be sent to the client devices in any desired manner, such as for example, by pushing the detection record, downloading the detection record, emailing the detection record, etc.

Figure 7:
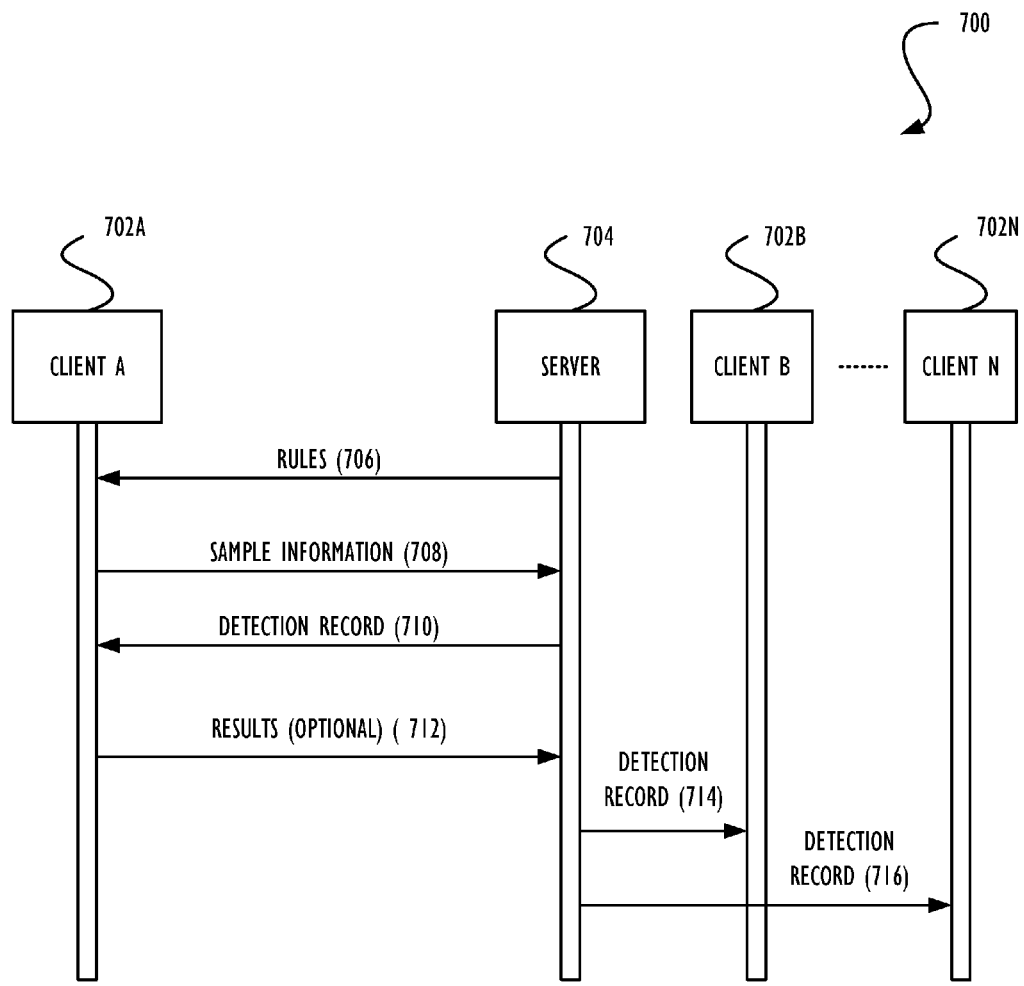
FIG. 7 shows a system for distributing detection records, in accordance with another embodiment.

FIG. 7 shows a system 700 for distributing detection records, in accordance with another embodiment. As an option, the present system 700 may be implemented in the context of the functionality and architecture of FIGS. 1-6. Of course, however, the system 700 may be implemented in any desired environment. Yet again, it should also be noted that the aforementioned definitions may apply during the present description.

As shown in operation 706, a first client 702A receives rules from a server 704. The rules may include rules for behaviorally identifying at least potentially unwanted data, in one embodiment. In another embodiment, the rules may indicate techniques for extracting information from samples of potentially unwanted data that has been detected by the first client 702A. Optionally, the rules may be received as an update to a database located on the first client 702A.

Additionally, the first client 702A detects potentially unwanted data. As noted above, the first client 702A may detect the potentially unwanted data utilizing the rules. Furthermore, the first client 702A extracts information from a portion of a sample of the potentially unwanted data, utilizing the rules. Such information is then sent to a server 704 in communication with the first client 702A. Note operation 708.

The server 704 may then analyze the information and generate a detection record based on the information. For example, the server 704 may generate a detection record capable of being utilized to detect other instances of the unwanted data. Such detection record is then sent from the server 704 to the first client 702A, as shown in operation 710.

Optionally, the first client 702A may verify the detection record utilizing the sample of unwanted data. In one embodiment, the first client 702A may apply the detection record to the sample of unwanted data (e.g. by comparing the detection record to the sample, etc.). Thus, the first client 702A may determine whether the detection record is capable of being used to identify other instances of the unwanted data (e.g. effectively, accurately, etc. identifies the unwanted data). To this end, as shown in operation 712, the first client 702A may send results of the verification to the server 704.

As a further option, the first client 702A may delete (e.g. discard, etc.) the detection record if it is determined that the detection record is invalid (e.g. does not identify the unwanted data). The server 704 may similarly delete the detection record if it is determined that the detection record does not identify the unwanted data. In addition, the server 704 may generate a new detection record utilizing the information extracted from the sample if it is determined that the detection record is not capable of being used to identify instances of the unwanted data.

As an option, the server 704 may receive several pieces of extracted information produced from a single unwanted object, and may reject some of the pieces of the extracted information. For example, the server 704 may check detection records produced from such pieces of extracted information against a database of predefined acceptable and/or unacceptable detection records. As yet another option, logic on the server 704 may be used to select one of the produced detection records, for example, based priorities of associated unique identifiers and/or location identifiers. Still yet, the server 704 may evaluate the quality of the produced detection records with respect to associated system speed and/or memory consumption, and may select the one detection record that is optimal regarding performance of a security system.

In another embodiment, if the results indicate that the detection record effectively identifies the unwanted data, the server 704 may send the detection record to other clients 702B-N. Note operations 714 and 716. For example, the detection record may be sent as an update to any number of different security systems located on the other clients 702B-N. Each of the clients 702A-N may therefore utilize the detection record for detecting instances of the unwanted data. Of course, however, the server 704 may also automatically send the detection record to the other clients 702B-N when sending the detection record to the first client 702A.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. At least one non-transitory computer readable storage medium having instructions stored thereon, comprising instructions that when executed cause a machine to:
reduce signature generation bandwidth utilization, comprising instructions that when executed cause the machine to:
receive from a client device:
an extract from a potentially unwanted data; and
an indication of how the extract was obtained from the potentially unwanted data;
generate a signature of the potentially unwanted data based on the extract and the indication; and
send the signature to the client device.

2. The at least one computer readable storage medium of claim 1, wherein the instructions further comprise instructions that when executed cause the machine to:
receive an offset of the extract into the potentially unwanted data,
wherein the instructions that when executed cause the machine to generate the signature comprise instructions that when executed cause the machine to generate the signature based on the extract, the indication, and the offset.

3. The at least one computer readable storage medium of claim 1, wherein the potentially unwanted data includes malware represented by a file on a storage media.

4. The at least one computer readable storage medium of claim 1, wherein the extract is based on a type of an operating environment associated with the potentially unwanted data.

5. The at least one computer readable storage medium of claim 1, wherein the extract is based on a type of an object in which the potentially unwanted data is located.

6. The at least one computer readable storage medium of claim 1, wherein the extract is based on a predetermined offset into the potentially unwanted data.

7. A computer system comprising:
one or more processors; and
a memory communicatively coupled to the one or more processors, wherein the memory stores instructions that when executed cause at least some of the processors to:
reduce bandwidth utilized by an analysis module, comprising instructions that when executed cause at least some of the processors to:
receive from a client device:
an extract from a potentially unwanted data; and
an indication of how the extract was obtained from the potentially unwanted data;
generate a signature of the potentially unwanted data based on the extract and the indication; and
send the signature to the client device.

8. The computer system of claim 7, wherein the analysis module further comprises instructions that when executed cause at least some of the one or more processors to:
receive an offset of the extract into the potentially unwanted data,
wherein the instructions that when executed cause at least some of the one or more processors to generate the signature comprise instructions that when executed cause at least some of the one or more processors to generate the signature based on the extract, the indication, and the offset.

9. The computer system of claim 7, wherein the potentially unwanted data includes malware represented by a file on a storage media.

10. The computer system of claim 7, wherein the extract is based on a type of an operating environment associated with the potentially unwanted data.

11. The computer system of claim 7, wherein the extract is based on a type of an object in which the potentially unwanted data is located.

12. The computer system of claim 7, wherein the extract is based on a predetermined offset into the potentially unwanted data.

13. The computer system of claim 7, further comprising a database, wherein the analysis module further comprises instructions that when executed cause at least some of the one or more processors to store the signature in the database.

14. At least one non-transitory computer readable storage medium having instructions stored thereon, comprising instructions that when executed cause a machine:
reduce signature generation bandwidth utilization, comprising instructions that when executed cause the machine to:
receive from a client device:
an extract from a potentially unwanted data;
an indication of how the extract was obtained from the potentially unwanted data; and
an offset of the extract into the potentially unwanted data;
generate a signature of the potentially unwanted data based on the extract, the indication, and the offset; and
send the signature to the client device.

15. The at least one computer readable storage medium of claim 14, wherein the potentially unwanted data includes malware represented by a file on a storage media.

16. The at least one computer readable storage medium of claim 14, wherein the extract is based on a type of an operating environment associated with the potentially unwanted data.

17. The at least one computer readable storage medium of claim 14, wherein the extract is based on a type of an object in which the potentially unwanted data is located.

18. The at least one computer readable storage medium of claim 14, wherein the extract is based on a predetermined offset into the potentially unwanted data.

19. At least one non-transitory computer readable storage medium having instructions stored thereon comprising instructions that when executed cause a machine to:
reduce bandwidth utilized for requesting a signature of potentially unwanted data, comprising instructions that when executed cause the machine to:
extract information from a potentially unwanted data;
identify how the information was extracted from the potentially unwanted data;
identify an offset of the information into the potentially unwanted data; and
request, from a server device, the signature based on the information, how the information was extracted from the potentially unwanted data, and the offset; and
receive the signature from the server device.

20. The at least one computer readable storage medium of claim 19, wherein the potentially unwanted data includes malware represented by a file on a storage media.

21. The at least one computer readable storage medium of claim 19, wherein the information is extracted based on a type of an operating environment associated with the potentially unwanted data.

22. The at least one computer readable storage medium of claim 19, wherein the information is extracted based on a type of an object in which the potentially unwanted data is located.

23. The at least one computer readable storage medium of claim 19, wherein the information is extracted based on a predetermined offset into the potentially unwanted data.

* * * * *